(12) United States Patent
Joshi et al.

(10) Patent No.: US 12,606,761 B2
(45) Date of Patent: Apr. 21, 2026

(54) TORREFACTION REACTOR AND PROCESS

(71) Applicant: TORRGREEN TECHNOLOGY B.V., Amsterdam (NL)

(72) Inventors: Yash Joshi, Mumbai (IN); Easwaran Krishnamurthy, Tamil Nadu (IN)

(73) Assignee: TORRGREEN TECHNOLOGY B.V., Amsterdam (NL)

( * ) Notice: Subject to any disclaimer, the term of this patent is extended or adjusted under 35 U.S.C. 154(b) by 502 days.

(21) Appl. No.: 17/616,275

(22) PCT Filed: Jun. 5, 2020

(86) PCT No.: PCT/EP2020/065597
§ 371 (c)(1),
(2) Date: Dec. 3, 2021

(87) PCT Pub. No.: WO2020/245337
PCT Pub. Date: Dec. 10, 2020

(65) Prior Publication Data
US 2022/0325197 A1     Oct. 13, 2022

(30) Foreign Application Priority Data

Jun. 7, 2019     (IN) .............................. 201941022657
Jul. 23, 2019     (NL) ...................................... 2023553
(Continued)

(51) Int. Cl.
*C10L 9/00*          (2006.01)
*C10L 5/44*          (2006.01)
(Continued)

(52) U.S. Cl.
CPC .............. *C10L 9/083* (2013.01); *C10L 5/445* (2013.01); *F16K 11/0856* (2013.01);
(Continued)

(58) Field of Classification Search
CPC .. C10L 9/08; C10L 9/083; C10L 5/445; C10L 2290/06; C10L 2290/08; C10L 2290/101
See application file for complete search history.

(56) References Cited

U.S. PATENT DOCUMENTS

| | | |
|---|---|---|
| 8,459,302 B2 | 6/2013 | Pederson et al. |
| 8,460,515 B2 | 6/2013 | Kawami et al. |
| | (Continued) | |

FOREIGN PATENT DOCUMENTS

| | | |
|---|---|---|
| CH | 702521 A2 | 7/2011 |
| CN | 107841362 A | 3/2018 |
| | (Continued) | |

OTHER PUBLICATIONS

Bergman et al., "Torrefaction for biomass co-firing in existing coal-fired power stations." Energy research Centre of the Netherlands (2005).

(Continued)

*Primary Examiner* — Prem C Singh
*Assistant Examiner* — Brandi M Doyle
(74) *Attorney, Agent, or Firm* — NIXON PEABODY LLP; Ronald I. Eisenstein; Nicole D. Kling

(57)          ABSTRACT

The invention is directed to a configuration comprising of more than one torrefaction batch reactors. A torrefaction batch reactor of the configuration comprises of a closed housing (2) having a gas inlet (4), a gas outlet (5) and a gas permeable biomass holding structure (6) positioned within the housing (2) defining a biomass holding space (7). The gas inlet (4) and the gas outlet (5) of the torrefaction batch reactor are alternatively fluidly connected to the following gas loops, (i) an air drying gas loop (20), (ii) a torrefaction gas loop (25), and (iii) a cooling gas loop (26). One or more batch reactors of the configuration are fluidly connected to the air drying gas loop (20) and one or more other batch (Continued)

Figure 2:
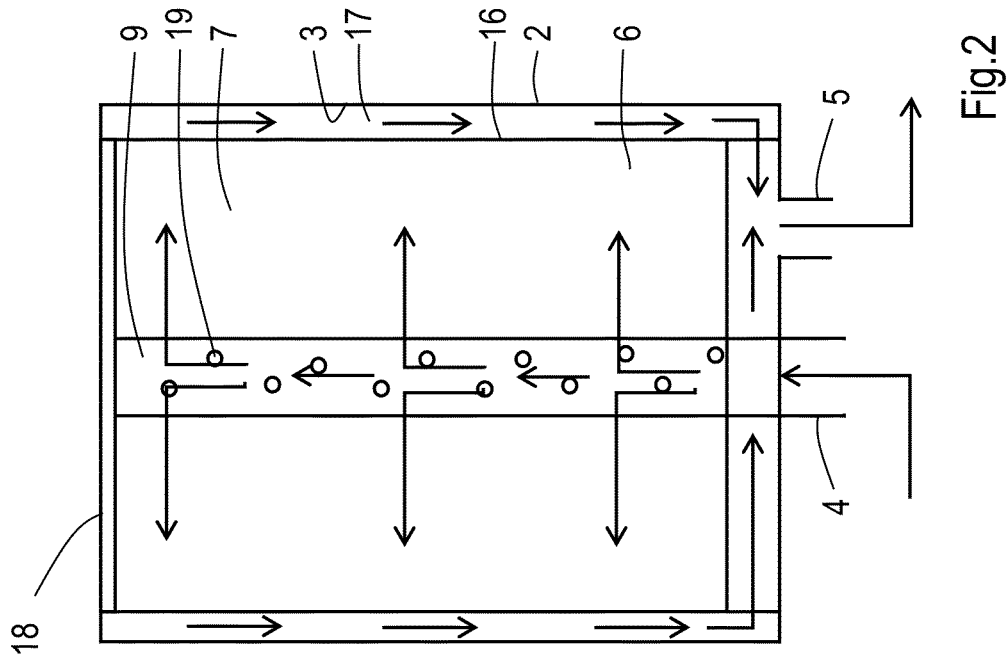

reactors are fluidly connected to the torrefaction gas loop (25).

6 Claims, 9 Drawing Sheets

(30)     Foreign Application Priority Data

| Jul. 23, 2019 | (NL) | ...................................... | 2023554 |
| Jul. 23, 2019 | (NL) | ...................................... | 2023555 |

(51)  Int. Cl.
   *C10L 9/08*          (2006.01)
   *F16K 11/085*      (2006.01)
(52)  U.S. Cl.
   CPC ....... *C10L 2290/06* (2013.01); *C10L 2290/08* (2013.01); *C10L 2290/10* (2013.01)

(56)     References Cited

U.S. PATENT DOCUMENTS

| 10,221,359 | B2 | 3/2019 | Phan |
| 2011/0067770 | A1 | 3/2011 | Pederson et al. |

| 2012/0060412 | A1* | 3/2012 | Raiko | ..................... C10B 49/02 |
| | | | | 44/550 |
| 2012/0137576 | A1 | 6/2012 | Lucio | |
| 2017/0233658 | A1 | 8/2017 | Shu et al. | |
| 2020/0270528 | A1* | 8/2020 | Schirnhofer | ............ C10B 53/02 |

FOREIGN PATENT DOCUMENTS

| FR | 2614625 | A1 | 11/1988 |
| JP | S5985465 | U | 6/1984 |
| JP | 2008274108 | A | 11/2008 |
| JP | 2013537291 | A | 9/2013 |
| WO | 2009095015 | A1 | 8/2009 |
| WO | 2018055003 | A1 | 3/2018 |

OTHER PUBLICATIONS

Prins et al. "More efficient biomass gasification via torrefaction." Energy 31:3458-3470 (2008).

* cited by examiner

TORREFACTION REACTOR AND PROCESS

CROSS-REFERENCE TO RELATED APPLICATIONS

This application is a 35 U.S.C. § 371 National Phase Entry Application of International Application No. PCT/EP2020/065597 filed Jun. 5, 2020, which designates the U.S. and claims benefit under 35 U.S.C. § 119 (a) of IN application No. 201941022657 filed Jun. 7, 2019, NL Application No. 2023553 filed Jul. 23, 2019, NL Application No. 2023554 filed Jul. 23, 2019, NL Application No. 2023555 filed Jul. 23, 2019, the contents of which are incorporated herein by reference in their entireties.

The invention is directed to a torrefaction reactor and to a torrefaction process.

Torrefaction is a well-known process wherein biomass is heated to an elevated temperature in the absence of any substantial amount of oxygen at conditions wherein the hemicelluloses as present in the biomass decomposes while keeping the celluloses and lignin of the biomass substantially intact. Torrefaction thereby increases the heating value per mass biomass and also removes a substantial amount of water, especially so-called bound-water, from the biomass. A further advantage of torrefaction is that the torrefied product is relatively uniform in properties even when starting from different sources of biomass. A next advantage is that the torrefied product can be easily ground to a powder, which in turn can be pelletized or used as such. Torrefaction thus converts a biomass to a high energy density product which can be easily transported and used as feed or fuel in different downstream processes.

In view of these advantages numerous torrefaction processes have been developed. A large number of these processes are continuous processes wherein biomass is continuously or intermittently fed to a reactor and torrefied product is discharged from the reactor. WO2012/102617 describes a process wherein the biomass is first dried in a fluidized bed reactor by directly contacting with a hot gas and subsequently torrefied in a moving bed reactor. WO13003960 describes a process wherein biomass is continuously torrefied in a directly fired rotary kiln reactor. US2013/0078589 describes a tubular reactor for a continuous torrefaction process of biomass.

A disadvantage of the torrefaction processes as described in these prior publications is that they are relatively complex and require a certain scale in order to operate them economically. This large scale will require a large volume of biomass to be processed, which in turn will have to be sourced from a large area. When for example, the biomass is a low density fibrous biomass, such as bagasse, the costs for transporting the biomass to the torrefaction process plant may become too high to operate the plant economically. But even if such a process would use a fibrous biomass as feed, instead of the usual wood chips, certain additional measures would be required. The fibrous biomass such as EFB left over from palm oil extraction or bagasse tend to bridge and not flow through even large openings. This makes the application of such a biomass in a continuous torrefaction process difficult. WO18071848 describes a pre-treatment wherein the fibrous biomass is dried, hammer milled and shaped into a cube before performing a torrefaction. The cubes can be transported in a continuous process. A disadvantage of such a pre-treatment is that it is energy intensive.

The object of the present invention is to provide a process and process configuration which can process fibrous biomass in a more simple manner.

This object is achieved by the following configuration. Configuration comprising of more than one torrefaction batch reactors, wherein a torrefaction batch reactor of the configuration comprises of a closed housing having a gas inlet, a gas outlet and a gas permeable biomass holding structure positioned within the housing defining a biomass holding space as present between the gas inlet and the gas outlet, and wherein the gas inlet and the gas outlet of the torrefaction batch reactor are alternatively fluidly connected to the following gas loops, (i) an air drying gas loop, (ii) a torrefaction gas loop, and (iii) a cooling gas loop, wherein one or more torrefaction batch reactors of the configuration are fluidly connected to the air drying gas loop and one or more other batch reactors are fluidly connected to the torrefaction gas loop.

Applicants found that this configuration can process a fibrous biomass by torrefaction in a simple manner. By operating the reactor as a batch reactor the fibrous biomass itself does not have to flow during the process. The fibrous biomass may be added to the reactor manually or semi-automatic which avoids the issues as bridging which could occur in a large scale continuous process. The energy intensive milling is not necessary and the process may be performed in a more energy efficient manner. Further the same reactor is used for both the drying of the biomass, the torrefaction itself as well as the cooling of the torrefied product by using the gas inlet and gas outlet of the reactor for supplying and discharging a drying gas, a torrefaction gas and a cooling gas to and from the reactor. This allows that simultaneously biomass is dried in one reactor, torrefied in another reactor and cooled in a further reactor. It has been found that the configuration can be operated efficiently using relatively small scale torrefaction reactors. This smaller scale allows to operate the process closer to the origin of the fibrous biomass. Thus the distance between the origin of the biomass and the torrefaction process will be less requiring less transportation.

The invention is also directed to a process to subject a biomass to torrefaction as performed in a configuration of more than one torrefaction batch reactors, by performing a sequence of cycle steps, wherein in one or more cycle steps the following actions (a)-(f) take place simultaneously:

(a) providing biomass to a biomass holding space of a torrefaction batch reactor, (b) drying the biomass by directly contacting the biomass obtained in a previous cycle step as present in the holding space of another torrefaction batch reactor with air having a temperature of between 50 and 150° C. thereby obtaining a torrefaction batch reactor comprising dried biomass, (c) heating dried biomass obtained in a previous cycle step in another torrefaction batch reactor to a temperature of between 230-280° C. by directly contacting the biomass with a substantially inert gas having a temperature of between 230 and 300° C. thereby obtaining a torrefaction batch reactor comprising torrefaction gas and a heated biomass, (d) directly contacting the heated biomass obtained in a previous cycle step in another torrefaction batch reactor with a substantially inert gas having a temperature of between 230 and 300° C. thereby obtaining a torrefaction batch reactor comprising torrefied biomass and a torrefaction gas, (e) cooling the torrefied biomass obtained in a previous cycle step comprised in another torrefaction batch reactor by directly contacting the torrefied biomass with a cooling gas having a temperature of between 10 and 100° C. thereby obtaining cooled torrefied biomass and (f) emptying the cooled torrefied biomass obtained in a previous cycle step comprised in another torrefaction batch reactor from the torrefaction batch reactor and re-using the thus obtained substantially empty batch reactor in a next action (a) optionally in the same cycle step.

In the configuration the torrefaction batch reactor may comprise of a closed tubular housing having an inner wall, a gas inlet and a gas outlet, a tubular gas permeable biomass holding structure positioned within the tubular housing defining a biomass holding space, wherein (A) the tubular gas permeable holding structure has a gas permeable end at both its ends and wherein the gas inlet is fluidly connected to an upstream end of the gas permeable holding structure and the gas outlet is fluidly connected to a downstream end of the gas permeable holding structure resulting in use in an axial gas flow through the biomass holding space, or alternatively (B) the tubular gas permeable holding structure has a gas permeable tubular wall, which wall is spaced away from the inner wall of the tubular housing thereby defining an annular space, wherein the gas inlet is fluidly connected to a gas distributor present within the biomass holding space and the gas outlet is fluidly connected to the annular space.

Because the gas distributor is positioned within the biomass holding space a flow path for drying gas, torrefaction gas and cooling gas will in use flow through the biomass holding space and directly heat or cool the biomass as present in this space.

In this description terms like above, below, upper, lower may be used to describe the apparatus or process according to this invention in an orientation in which it may be used. This does not limit the invention to this orientation unless specified as such. Perpendicular orientation to such a used orientation may for example also be possible.

The gas inlet and gas outlet of the torrefaction batch reactor may be present at two different ends of the closed tubular housing. Preferably the gas inlet and gas outlet are present at one end of the tubular housing and more preferably at the lower end of the reactor. The opposite end of the tubular housing may then be provided with a detachable closure, preferably at its upper end. Via the detachable closure the fresh biomass may enter the reactor and torrefied biomass be discharged from the reactor.

The gas permeable biomass holding structure may be any structure which allows gas to flow through the biomass. Preferably the flow of gas is such that the biomass is evenly contacted with the gas such to result in that all of the biomass is torrefied to substantially the same level. The structure is capable of holding the fresh biomass and torrefied biomass within said holding structure. The walls of the holding structure which require gas passage are suitably provided with large enough openings for passage of the gas and small enough to avoid that biomass and torrefied biomass passes these openings.

For reactor (A) the tubular gas permeable holding structure has a gas permeable end at both its ends. The tubular side walls of such a holding structure may be the inner wall of the tubular housing. Preferably the tubular side wall is a closed side wall spaced away from the inner wall of the tubular housing. The resulting annular space may be used to fluidly connect the downstream end of the tubular biomass holding structure and a gas outlet positioned at the lower end of the reactor. This annular space may also be filled with stationary air or with an insulation material. In such a reactor it is preferred to have a conduit for gas fluidly connecting the downstream end of the tubular gas permeable holding structure with the gas outlet. Such a conduit may run through the biomass holding space. Preferably the conduit is positioned along the axis of the tubular gas permeable holding structure. The use of such a conduit is preferred because lower wall temperatures the reactor may then be achieved. The upstream end of the biomass holding structure is preferably open which allows gas to flow upwardly from a gas inlet into the biomass holding space in a substantially axial upward direction. The upper end of the reactor is preferably provided with a detachable closure. When opened fresh biomass may be added to the biomass holding space and torrefied biomass may the easily be removed from the biomass holding space.

For reactor (B) the tubular gas permeable holding structure has a gas permeable tubular wall. Preferably the gas permeable biomass holding structure comprises of a circular closed bottom as a biomass support and a tubular gas permeable wall, wherein the tubular gas permeable wall is spaced away from the inner wall of the tubular housing. This tubular gas permeable wall will thus have a diameter which is smaller than the inner diameter of the tubular housing.

The gas distributor of reactor (B) may suitably be any device which can supply a gas to the biomass holding space and ensure that the biomass is evenly contacted with the gas such to result in that all of the biomass is torrefied to substantially the same level. Short circuiting of gas is suitably avoided. Preferably the gas distributor is a co-axially positioned conduit within the tubular housing and provided with openings fluidly connecting the gas inlet with the biomass holding space. The conduit may have any cross-sectional design. Preferably the conduit is a tube, preferably a metal tube. The conduit is suitably closed at its downstream end. In this manner a radial and horizontal flow path for the gas through the biomass may be achieved.

In such a semi-closed conduit a pressure gradient will result along its length. To ensure that the gas evenly is discharged from this conduit into the biomass holding space additional measures may be taken. For example the area of openings at its upstream end may be larger the area of openings at its downstream end. The conduit may have a decreasing cross-sectional area towards its downstream end. A second conduit provided with openings may be positioned around the conduit in order to equalize the flow of gas. Preferably the co-axially positioned conduit is provided with pressure equalizing means, like for example one or more flow restrictions in the conduit. It is found that acceptable flows are achieved when the conduit, preferably a tube, is provided with two baffles along its length for the smaller batch reactor as will be described in more detail below. The diameter of the opening of the baffle is suitably between 30 and 60% of the diameter of a preferred tubular gas distributor.

The reactor (A) and (B) as described above may also be positioned on its side wherein the gas flows are in a horizontal direction. Such an orientation provides the same advantageous biomass conversion and may be more desired for emptying and charging the reactors in actions (a) and (f).

The torrefaction batch reactor may have any size. Applicants however found that a relatively small scale torrefaction process of for example of about 300 to 1000 kg/hr or 300 to 350 kg/hr torrefied biomass may be achieved using a number of smaller batch reactors in a system and process described below. Preferably the closed tubular housing is made of steel and is provided with one or more corrugations to enhance its structural strength. More preferably the closed tubular housing is drum, more preferably an adapted ISO steel drum and even more preferably the ISO steel drum is a Full Open Head (FOH) drum. Such steel drums having a height of about 889 mm and an outer diameter of about 583 mm have been found advantageous because they are readily available, can withstand the process temperatures and can in a group provide a semi-continuous torrefaction process of the above desired production capacity of between 300 to 350 kg/hr. Higher production capacity up to 1000 kg/hr is possible by using reactors having a proportional larger volume. It must be clear that the batch reactors may be manufactured differently while some of the advantages are also achieved.

The invention is also directed to a torrefaction batch reactor comprising a closed housing having a gas inlet a gas outlet, a gas permeable biomass holding structure positioned within the housing defining a biomass holding space as present between the gas inlet and gas outlet, and wherein the gas inlet and the gas outlet are alternatively fluidly connected to the following gas loops, (i) an air drying gas loop,
(ii) a torrefaction gas loop, substantially inert and
(iii) a cooling gas loop.

The air drying gas loop of the configuration or the above described torrefaction batch reactor suitably comprises an air heater, a gas displacement means, an air inlet and a wet gas outlet. The torrefaction gas loop suitably comprises a gas heater, a gas displacement means, an inlet for an substantially inert gas and an outlet for generated torrefaction gas. The cooling gas loop suitably comprises a gas cooler and a gas displacement means.

The torrefaction batch reactor which can be alternatively connected to gas loops (i)-(iii) may be any torrefaction batch reactor wherein a gas flows through a gas permeable biomass holding space from a gas inlet to a gas outlet. The housing may be a tubular housing having a gas inlet and a gas outlet and preferably the torrefaction batch reactor is a reactor (A) or (B) according to this invention.

The invention is directed to a system, also referred to as a configuration, of more than one torrefaction batch reactor as for example described above, wherein one or more batch reactors are fluidly connected to the air drying gas loop and one or more other batch reactors are fluidly connected to the torrefaction gas loop and preferably one or more other reactors are connected to the cooling gas loop and wherein one or more other reactors are in a transition mode in which biomass may be added to the reactor and torrefied biomass may be discharged from the reactor. In this system at least one reactor is thus connected to the air drying gas loop (i), at least one reactor is connected to the torrefaction gas loop (ii), at least one reactor is connected to the air drying gas loop (iii) and at least one reactor is in the transition mode (iv). After a cycle time period of for example between 5 and 10 minutes a reactor filled with fresh biomass is connected to the drying gas loop (i), another reactor is disconnected from the drying gas loop (i) and connected to the torrefaction gas loop (ii), another reactor is disconnected from the torrefaction gas loop (iii) and connected to the cooling gas loop (iii) and another reactor is disconnected from the cooling gas loop (iii) and emptied from torrefied biomass and filled with fresh biomass. If more than one reactor is connected to the same gas loop (i)-(iii) the reactor which is disconnected from the gas loop will suitably be the reactor which has been connected to the gas loop for the longest time. Applicants found an optimal system is a system consisting of at least eight batch torrefaction reactors, preferably made of steel drums or reactors having a similar volume, wherein two reactors or more are at one time connected to the air drying gas loop (i), three reactors or more are connected to the torrefaction gas loop (ii), two reactors or more are connected to the air drying gas loop (iii) and one reactor or more is in the transition mode (iv).

Preferably the configuration comprises eight torrefaction batch reactors wherein two torrefaction batch reactors are at one time connected to the air drying gas loop (i), three torrefaction batch reactors are connected to the torrefaction gas loop (ii), two torrefaction batch reactors are connected to the air drying gas loop (iii) and one torrefaction batch reactor is in the transition mode (iv).

Preferably the cycle time, the time of one cycle step of the process, is between 5 and 10 minutes, more preferably between 6 and 9 minutes of this system. More than eight batch torrefaction reactors may be used. However such a higher number than eight increases the complexity of the system, requiring more conduits, valves and/or more complex valves.

In the above system a multitude of connecting and disconnecting the torrefaction batch reactors to the different gas loops will take place. This may be achieved by using a valve system. Such a system is complex and in order to simplify the system it is preferred to use a rotary valve such as for example a so-called multi-passage rotary unions. Such a rotating valve has different discrete positions. In one first position the valve can fluidly connect a first torrefaction batch reactor or reactors of the configuration to the air drying gas loop, can fluidly connect a different second torrefaction batch reactor or reactors of the configuration to the torrefaction gas loop, can fluidly connect a different third torrefaction batch reactor of the configuration to the cooling gas loop and can fluidly disconnect a different fourth torrefaction batch reactor or reactors of the configuration from the gas loops resulting in that the different fourth torrefaction batch reactor is in the transition mode and wherein in another second position of the valve one or more torrefaction batch reactors are connected to a different gas loop than the gas loop of the first valve position.

A preferred system comprises a rotating valve wherein in one position of the valve two torrefaction batch reactors are fluidly connected to the drying gas loop, two or preferably three torrefaction batch reactors are fluidly connected to the torrefaction gas loop, two torrefaction batch reactors are fluidly connected to the cooling gas loop and one torrefaction batch reactor is fluidly disconnected from the gas loops resulting in that this reactor is in the transition mode. In a next new position of the rotating valve the torrefaction batch reactor which was in the transition mode in the previous position of the valve is connected to the drying gas loop, one torrefaction batch reactor which was connected to the drying gas loop in the previous position of the valve is connected to the torrefaction gas loop, one torrefaction batch reactor which was in the torrefaction gas loop in the previous position of the valve is connected to the cooling gas loop and one torrefaction batch reactor which was connected to the cooling gas loop in the previous position of the valve is disconnected from the cooling gas loop and is in the transition mode. In this system the torrefaction batch reactor which is disconnected from a gas loop will suitably be the reactor which has been connected to the gas loop for the longest time.

In a system of eight batch reactors the number of discrete valve positions in preferably eight.

Applicants found that a system as described above, and preferably a system wherein the batch reactors have a closed tubular housing being for example an adapted ISO steel drum or slightly larger sized reactors having a tubular housing, may be very compact. This results in that the entire system or configuration of for example eight reactors may be present in one or more 20 ft shipping containers. The tubular reactors having an axis may be positioned vertically along their axis or horizontally along their axis in such a shipping container. This is advantageous because it allows simple transportation of the system to the source of the biomass instead of having to transport fresh biomass to a centrally operated large scale torrefaction process. Preferably the more than one torrefaction batch reactors according to this invention are present in a first 20 ft shipping container and wherein the air heater of the air drying loop, the gas heater of the torrefaction gas loop and the gas cooler of the cooling gas loop are present in a second 20 ft shipping container. The batch reactors are preferably detachably connected to the gas inlet and outlet conduits present in the container. This enables one to remove a batch reactor when in the transition mode, discharge torrefied biomass from the reactor and add fresh biomass to said reactor. The reactor with fresh biomass may then be replaced in the container and reconnected to the gas conduits. The shipping container is preferably provided with a number of doors in its longitudinal sidewalls each door corresponding with a batch reactor. Via the door a single batch reactor may be removed to discharge torrefied biomass and to add fresh biomass.

The invention is further directed to the above described process to subject a biomass to torrefaction as performed in a configuration of more than one torrefaction batch reactors by performing a sequence of cycle steps, wherein in one or more cycle steps the actions (a)-(f) take place simultaneously. An action performed to one torrefaction batch reactor may be completed in one cycle step. For example actions (a) and (f) may take place in one cycle step for a same batch torrefaction reactor. Action (b) is preferably performed in two cycle steps, action (c) is preferably performed in one cycle step, action (d) is preferably performed in three cycle steps and action (e) performed in one cycle step.

Action (b) is preferably performed by connecting a torrefaction batch reactor of the configuration to the air drying gas loop. Action (c) and (d)) is preferably performed by connecting a torrefaction batch reactor of the configuration to the torrefaction gas loop. Action (e) preferably performed by connecting a torrefaction batch reactor of the configuration to the torrefaction gas loop. For a configuration comprising of eight torrefaction batch reactors wherein two torrefaction batch reactors are at one time connected to the air drying gas loop (i), four torrefaction batch reactors are connected to the torrefaction gas loop (ii), one torrefaction batch reactors is connected to the air drying gas loop (iii) and one torrefaction batch reactor is in the transition mode (iv).

Action (a) may be performed using a hopper and fill the reactor from above using gravity. The content of the reactor may be somewhat compressed by a pressing on top of the biomass in the reactor to make space for additional biomass. The biomass density after performing action (a) is preferably between 80 and 120 kg/m³ and more preferably between 90 and 100 kg/m³.

The reactor may be positioned vertically or horizontally when performing actions (b) to (e). By vertically is meant that the gasses pass the biomass in a vertical direction and in case of a tubular reactor the axis of the tubular reactor is positioned vertically. By horizontally is meant that the gasses pass the biomass in a horizontal direction and in case of a tubular reactor the axis of the tubular reactor is positioned horizontally. Action (a) and (f) may be performed when the reactor is positioned in any direction including sloping directions. This may for example involve that the reactor is toggled from its previous horizontal position to a vertical position to allow biomass to be removed and supplied vertically, for example via a removable lid at the upper end. The reactor may also be in a horizontal position when performing actions (a) and (f). In a preferred embodiment steps (a) and (f) are performed, on a suitably horizontal reactor, simultaneously by using a hydraulic piston transferring the biomass into the reactor from an axially adjunct feeding trough. In the same stroke of the piston, the torrefied biomass at the end opposite to the feeding end is ejected from the reactor due to the displacement of the biomass.

In the above process the substantially inert gas in action (c/d) comprises less than 3 vol. % oxygen. Preferably the substantially inert gas in action (c) and in action (d) comprises of the torrefaction gas obtained in action (c) and in action (d) and/or the combustion gasses obtained when combusting this torrefaction gas. Suitably the substantially inert gas flows in a torrefaction gas loop comprising of a gas heater, a gas displacement means, the biomass holding space and an outlet for generated torrefaction gas. The substantially inert gas used in action (c) and in action (d) at start-up of the process suitably comprises of more than 50 vol % and preferably of more than 95% vol % carbon dioxide.

The air heater and the substantially inert gas heater are preferably one apparatus. The required heat is provided by combustion of torrefaction gas. Preferably some additional fuel is used to comply to the total energy demand of the torrefaction process. This additional fuel may be any gaseous or solid fuel. Preferably some of the dried or torrefied biomass is used as this additional fuel. Such a heater in which torrefaction gas and dried or torrefied biomass is used as fuel may be for example be a moving grate incinerator. The air used in action (b) and the substantially inert gas used in action (c) is preferably heated up by indirect heat exchange against the combustion gasses obtained when combusting the torrefaction gas and dried or torrefied biomass in for example such a moving grate incinerator.

The pressure at which actions (b), (c), (d) and (e) are performed may be any pressure between ambient and 2 MPa. Preferably the pressure is between 0.1 and 0.25 MPa allowing the use of thinner walled reactors.

The torrefied biomass as obtained in action (f) may be pulverised such to reduce its volume. The powder thus obtained may be used as such as a fuel or as a feedstock for another process. The powder may also be pressed into pellets or briquettes. This is advantageous for easier transport and handling.

The biomass used as feed to the above process or used in the above described batch reactors according to the invention or in the system according this invention may be any biomass which allows a certain gas flow from a gas inlet to a gas outlet through the mass of biomass. Such a gas flow is found to be achievable when the biomass has a bulk density of below 200 kg/m3 and preferably below 100 kg/m3. The biomass may be wood, like for example wood chips or pellets. Preferred sources of biomass are fibrous biomass like for example oil palm empty fruit bunch fiber (OPEFBF), coconut coir fiber (CCF), pineapple peel (PP), pineapple crown leaves (PCL), kenaf bast fiber (KBF), kenaf core fiber (KCF), sugarcane bagasse, sugarcane trash, rice straw and/or wheat straw.

The process is preferably performed in a system of more than one torrefaction batch reactor according to this invention. In such a process at one moment in time all actions (a)-(f) are performed simultaneously in the different torrefaction batch reactors of the system.

The invention is also directed to a valve which can be used in the configuration and process as described above. Rotating valve having a rotatable central body with a number of discrete rotatable positions comprising n gas inlet conduits and n gas outlet conduits and positioned within a stationary body, wherein between the stationary body and the rotatable central body 2n annual spaces are present and wherein each gas inlet conduit is fluidly connected to a separate annular inlet space and each gas outlet conduit is fluidly connected to a separate annular outlet space, wherein the gas inlet conduits have a gas inlet opening at one axial end of the rotatable central body and wherein the gas outlet conduits have a gas outlet at the same axial end of the rotatable central body, wherein the axial end faces a stationary partition provided with openings aligning with the n gas inlet openings and aligning with the n outlet openings depending on the discrete rotatable position of the rotatable central body, wherein the stationary body is provided with n gas outlets and n gas inlets and wherein each gas outlet is connected to a separate annular inlet space and wherein each gas inlet is fluidly connected to a separate annular outlet space, and wherein the rotatable central body can move axially with respect to the stationary body.

Applicants found that with such a rotating valve it is possible to fluidly connect multiple batch reactors with more than one gas loop, for example a drying gas loop and a heating gas loop, and to easily change the these connections. In that manner a reactor may be first connected to a drying gas loop and once the drying stage is completed the reactor may be connected to a heating gas loop by changing from one discrete position of the valve to another discrete position.

The valve according to the invention is more suited for this application that prior art valves such as described in US2011/0067770 because it can process gasses having different temperatures. If the prior art valve would have been used for such gas streams a very bulky valve would have resulted. Moreover the undesired conductive heat transfer between the gas streams in the valve would have been significant because of inevitably closely spaced thermal masses. A next problem is that the manufacturing of such a value would be complex. Another problem is that when such a valve is used for gas streams leakage may occur. The present valve does not have such disadvantages. By having a valve with 2n annular spaces on the one hand and having a stationary body provided with n radial gas outlets and n radial gas inlets it is possible to connect n gas loops with any number of reactors. The number of gas loops may be easily adjusted by varying the length of the valve. The number of reactors may be easily adjusted by altering the number of axial gas inlets and outlets at the axial end of the central body. Further the valve limits gas leakage because of the relative axial movement of the rotatable central body with respect to the stationary body. This allows one to press sealing surfaces onto each other in an axial direction and fluidly disconnect the annular spaces from each other.

The rotating valve is suitably used in a batch process comprising more than one batch reactor operating in different operational stages. The batch process may be any process wherein the reactants as present in a batch reactor are consequently contacted with different gas flows in the different operational stages. The different gas flows may have for example different composition and/or different temperature properties. A preferred use, which will be further described, is wherein the batch reactor is a torrefaction batch reactor and the operational stages comprise a drying stage, a torrefaction stage and a cooling stage.

The invention shall be illustrated by the following FIGS. 1-11.

Figure 1:
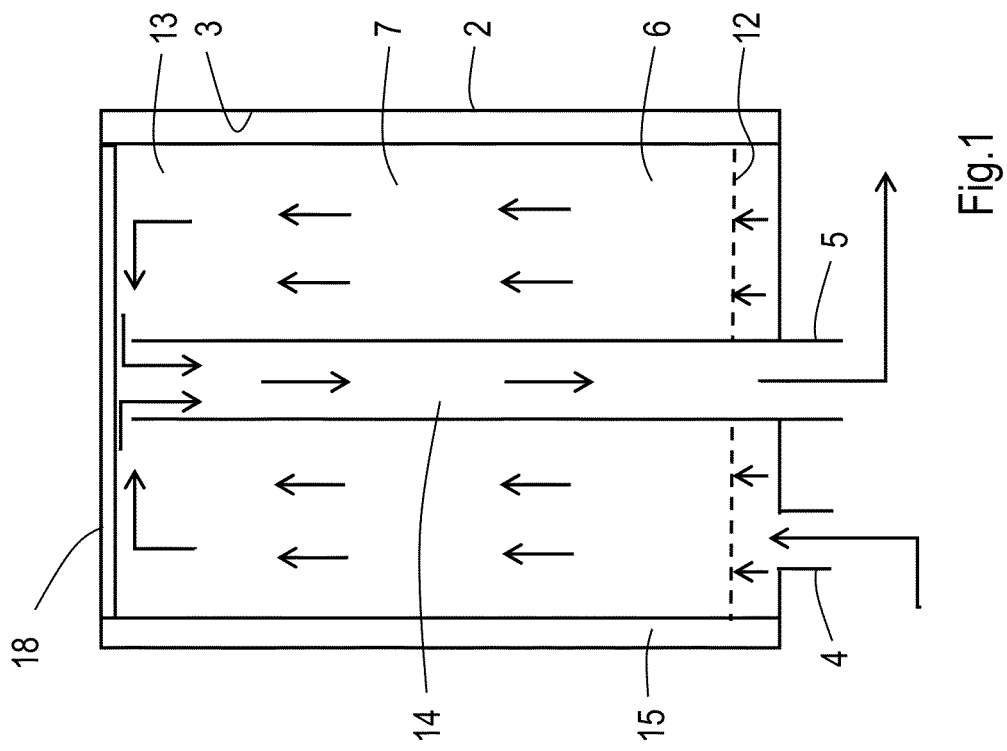

FIG. 1 shows a batch reactor A (1) having a closed tubular housing (2) having an inner wall (3), a gas inlet (4) and a gas outlet (5), a tubular gas permeable biomass holding structure (6) positioned within the tubular housing (2) defining a biomass holding space (7).

The tubular gas permeable holding structure (6) has a gas permeable end at both its ends (12,13). The gas inlet (4) is fluidly connected to one upstream end (12) of the gas permeable holding structure (6) and the gas outlet (5) is fluidly connected to the downstream end (13) of the gas permeable holding structure (6). This results in use that gasses will flow in an axial gas flow through the biomass holding space (7). The gasses at the downstream end (13) may de discharged at the upper end of the tubular housing (2). In this figure an embodiment is shown wherein the gasses flow via an axially positioned tube (14) to the gas outlet (5) as positioned at the lower end of the tubular housing (2). This is advantageous because inlet (4) and outlet (5) will be located close to each other which simplifies the connection of the reactor to the gas loops. As an alternative the gasses at the downstream end (13) may also flow via the annular space (15) as present between the inner wall (3) of the tubular housing (2) and the gas permeable holding structure (6) to the outlet (5). Further a detachable closure (18) is present on top of the reactor enabling adding fresh biomass and discharging torrefied biomass from the reactor when the reactor is in its transition mode. In the annular space (15) insulation may be present. The arrows in FIGS. 1 and 2 illustrate the intended gas flow in the reactor.

FIG. 2 shows a batch reactor B (1) having a closed tubular housing (2) having an inner wall (3), a gas inlet (4) and a gas outlet (5), a tubular gas permeable biomass holding structure (6) positioned within the tubular housing (2) defining a biomass holding space (7).

The tubular gas permeable holding structure (6) has a gas permeable tubular wall (16), which wall is spaced away from the inner wall (3) of the tubular housing (2). Between wall (16) and inner wall (2) an annular space (17) is present. The gas inlet (4) is fluidly connected to a gas distributor (9) present within the biomass holding space (7). The gas outlet (5) is fluidly connected to the annular space (17). The gas distributor (9) is a co-axially positioned conduit (18) within the tubular housing (2) and provided with openings (19) fluidly connecting the gas inlet (4) with the biomass holding space (7). The inlet (4) and outlet (5) are located close to each other which simplifies the connection of the reactor to the gas loops. A detachable closure (18) is present having the same functionality as in FIG. 1.

Figure 3:
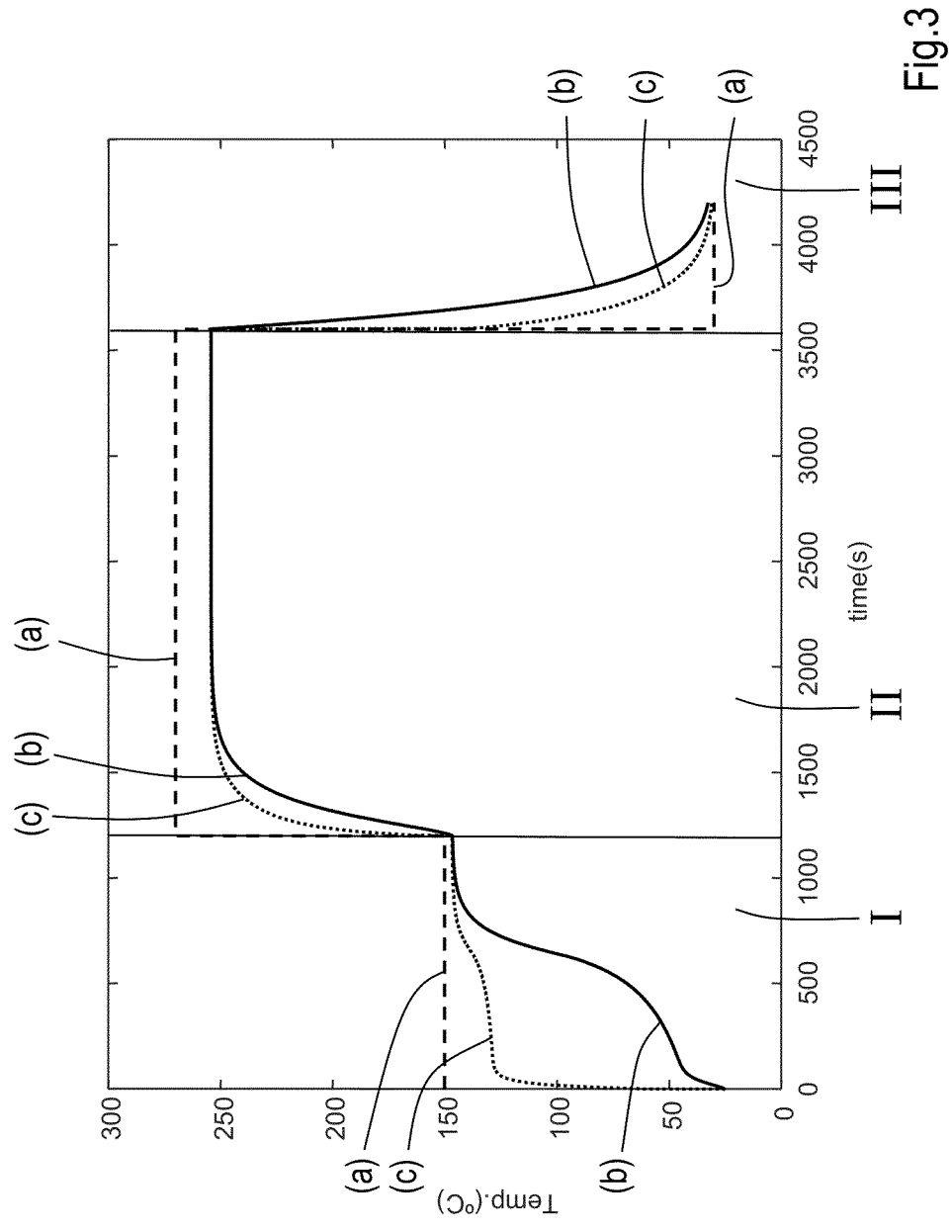

FIG. 3 shows line (a) which is the temperature of the gas entering a torrefaction batch reactor as for example shown in FIGS. 1 and 2 for a specific action, line (b) is the temperature of the solid biomass in the reactor for this action and line (c) is the temperature of the gas exiting the reactor for this action. The step wise change in temperature of the gas entering the reactor (line (a)) is when the reactor is connected to the air drying loop (I), the torrefaction gas loop (II) and the cooling gas loop (III). A shown the drying phase (action (b)) continues to a point wherein the temperature of the gas entering the reactor is about the same as the temperature leaving the reactor. Actions (c) and (d) take place when the reactor is connected to the torrefaction gas loop (II). At the start the heating action is shown when the biomass temperature increases. Action (d) is when the temperature of the biomass and the gas leaving the reactor is about the same as shown. In this torrefaction stage, action (d), the temperature is for the majority of the time at the desired torrefaction temperature, which is 250° C. for this particular biomass. The start of In the cooling stage the cooling is terminated when the temperature of the gasses leaving the reactor is below 50° C. and suitably close to the cooling gas temperature.

Figure 4:
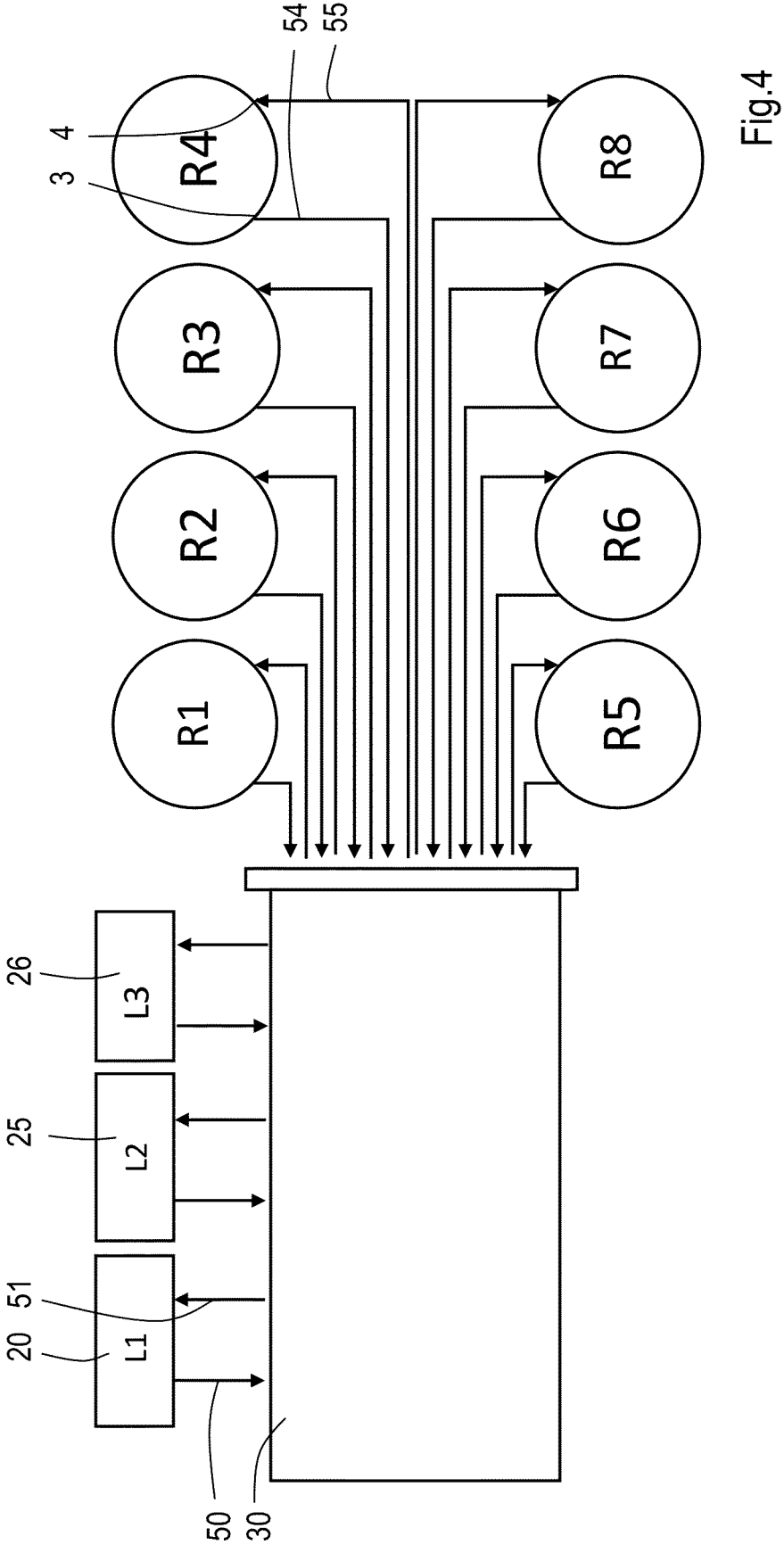

FIG. 4 shows how eight torrefaction reactors (R1-R8) are connected to an air drying gas loop L1 (20), a torrefaction gas loop L2 (25) and a cooling gas loop L3 (26) via a rotary valve (30). The rotary valve may connect each reactor (R1-R8) with any one of gas loops (L1-L3) as will be explained in FIGS. 5-11. For example an air inlet (50) of drying gas loop (20) may be connected to the inlet (4) of reactor R4 via rotating valve (30) and conduit (55) and the wet gas leaving the reactor via gas outlet (5) of reactor R4 will be connected to the wet gas outlet (51) of the air drying loop (20) via conduit (54) and rotating valve (30). The rotary valve (30) is preferably a novel multi-passage rotary union as described in FIGS. 5-11. Because we believe this valve is novel the invention is also directed to the valve itself as described below.

Figure 5:
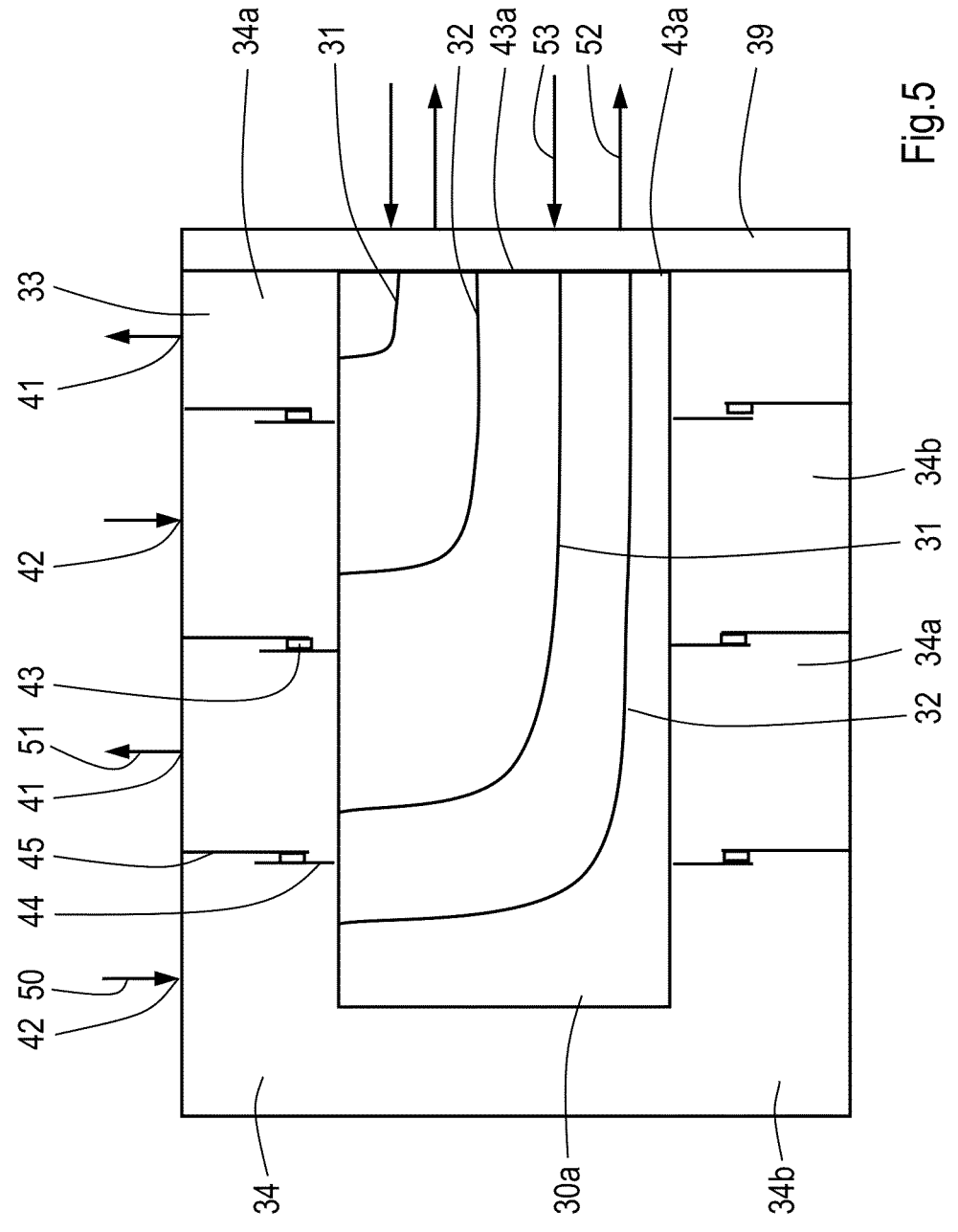
Figure 6:
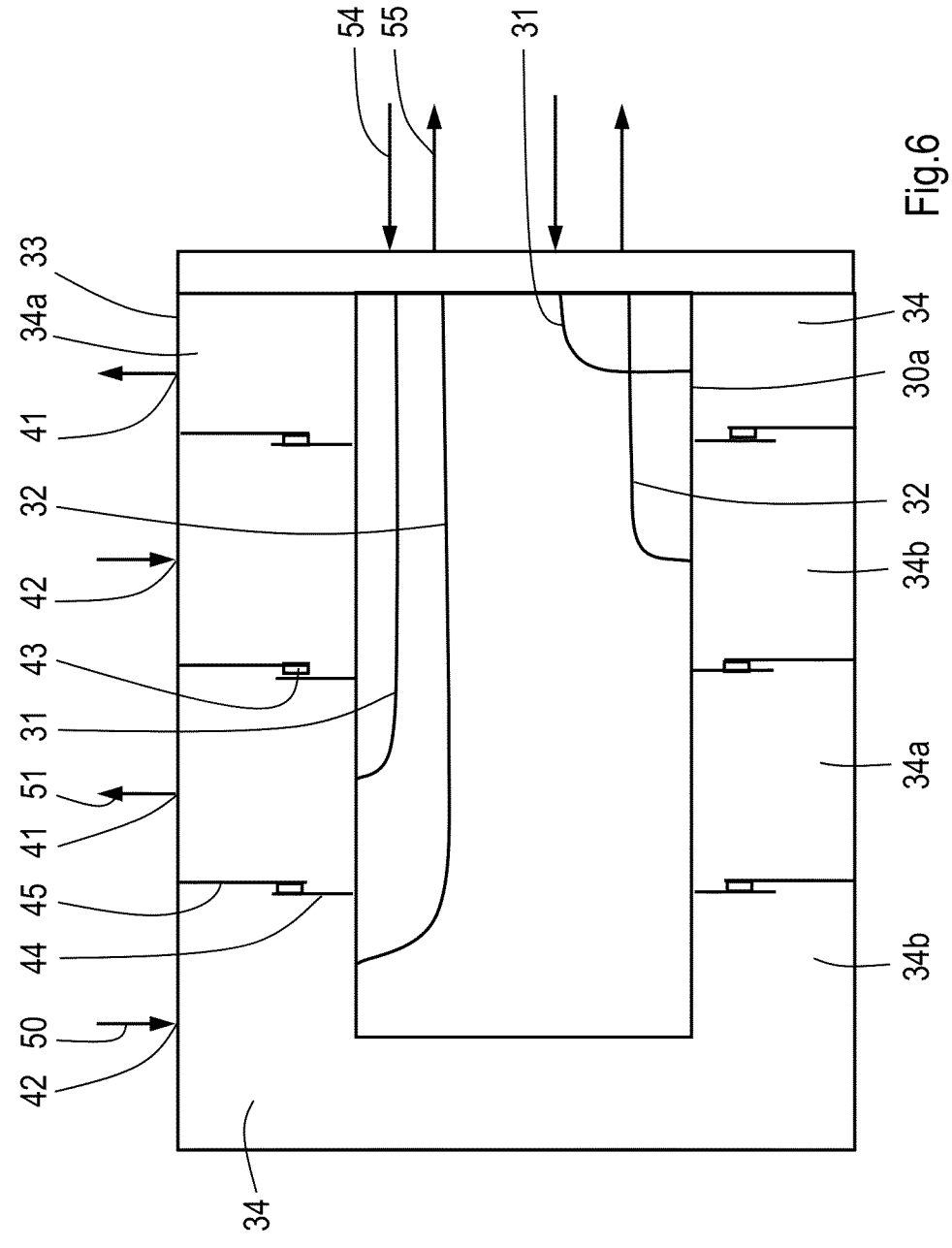
Figure 7:
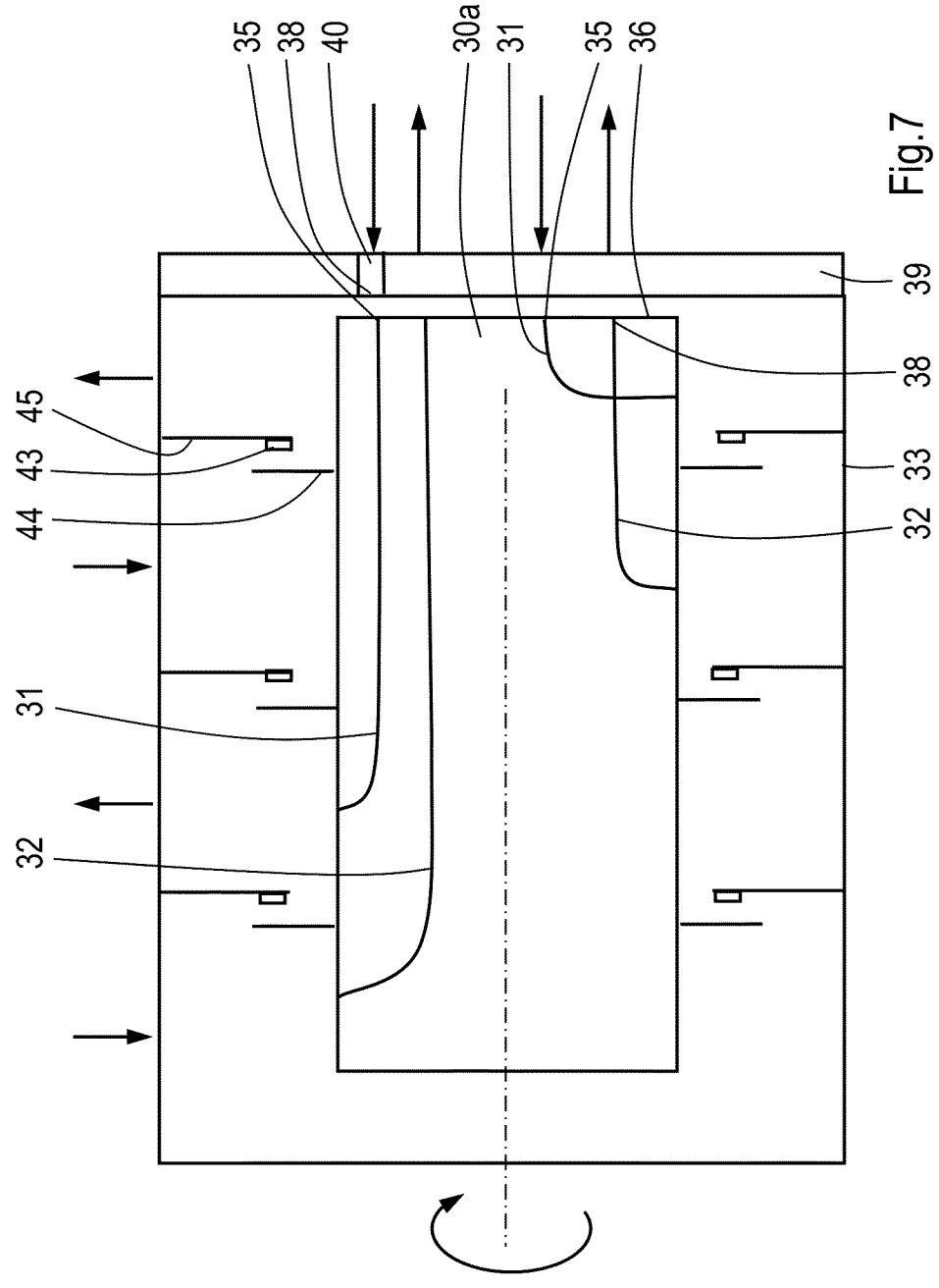

Rotating valve (30) having a rotatable central body (30a) with a number of discrete rotatable positions comprising n gas inlet conduits (31) and n gas outlet conduits (32) and positioned within a stationary body (33), wherein between the stationary body and the rotatable central body 2n annual spaces (34a,34b) are present and wherein each gas inlet conduit (31) is fluidly connected to a separate annular inlet space (34a) and each gas outlet conduit (32) is fluidly connected to a separate annular outlet space (34b). N may be any number and suitably n is a value from 2 to 5. In FIGS. 5-7 n is two and in FIGS. 8-11 n is three. The gas inlet conduits (31) have a gas inlet opening (35) at one axial end (36) of the rotatable central body (30a). The gas outlet conduits (32) have a gas outlet (37) at the same axial end (36) of the rotatable central body (30a). The axial end (36) faces a stationary partition (39) provided with openings (40) aligning with the n gas inlet openings (38) and aligning with the n outlet openings (35) depending on the discrete rotatable position of the rotatable central body (30a). The stationary body (33) is provided with n gas outlets (41) and n gas inlets (42) and wherein each gas outlet (41) is connected to a separate annular inlet space (34b) and wherein each gas inlet (42) is fluidly connected to a separate annular outlet space (34a). The rotatable central body (30a) can move axially with respect to the stationary body (33). This may be performed by fixing the rotatable central body (30a) with respect to a basis, like a floor, and moving the stationary body (33) or vice versa. These reference numbers may be found in FIGS. 5-7. For clarity reasons not all reference numbers have been mentioned in all Figures for all shown parts.

In FIGS. 5 and 6 two discrete rotatable positions of the central body (30a) are shown. In such a discrete position the annular spaces (34a,34b) are suitably fluidly disconnected from each other by a seal (43) resulting from an axial force pressing a radial extending surface (44) of the central body (30a) onto an inward radially extending surface (45) of the stationary body (33). A further seal (43a) ensures that the rotatable body (30a) is gas tight fixed onto the stationary partition (39). Preferably one or both of these surfaces are provided with a gas seal, such as for example a graphite packing, Teflon packing or O-rings.

In FIG. 5 flow (53) is connected to flow (51) and flow (50) is connected to flow (52). Flow (50) and flow (51) may for example be part of the drying gas loop (20) of FIG. 4 and flow (52) may be connected to the inlet (4) of a torrefaction reactor and flow (53) connected to the outlet of the same torrefaction reactor. Part (39) may be configured such that flow (53) is the gas outlet of a different torrefaction reactor which reactors are configured in series. This means that the outlet of the first reactor of the series is directly connected to the inlet of the second reactors and so on.

In FIG. 6 flow (50) is connected to a different flow (55) and flow (51) is connected to a different flow (54). This illustrates how the same gas loop comprising flows (50) and (51) may be connected to the inlet and outlets of a different torrefaction batch reactor via flows (54) and (55) compared to the situation shown in FIG. 5. Part (39) is also configured to cut off one or more reactors from any gas loop such to enable adding fresh biomass and discharging torrefied biomass from said reactor(s).

FIG. 7 illustrates how the rotating valve (30) may rotate from one discrete position as for example shown in FIG. 5, to another discrete position, as for example shown in FIG. 6, by rotating the central body (30a) after axially spacing away the radial extending surfaces (44) of the central body (30a) from the inward radially extending surfaces (45) of the stationary body (33) by axial movement of the rotatable central body (30a) with respect to the stationary body (33). This axial movement is shown in FIG. 7. In this manner the seal (43) is broken which allows a free rotatable movement of the central body (30a). When the desired discrete rotational position is reached the rotatable central body (30a) axially moves back such to fluidly disconnected the annular spaces (34a,34b) by seal (43). When such a valve is used in the configuration and process according to this invention it is preferred that the gas flow in the air drying gas loop, the torrefaction gas loop, and the cooling gas loop is temporarily interrupted to limit any contamination between these gas flows between the annual annular spaces (34a,34b) and any outward leakage of the gases into the environment. A small contamination is not disadvantageous for the torrefaction process according to this invention. The annular spaces that could potentially leak to the environment are allotted to the gas loops containing air, and hence a small leakage is completely tolerable by the process.

Figure 8C:
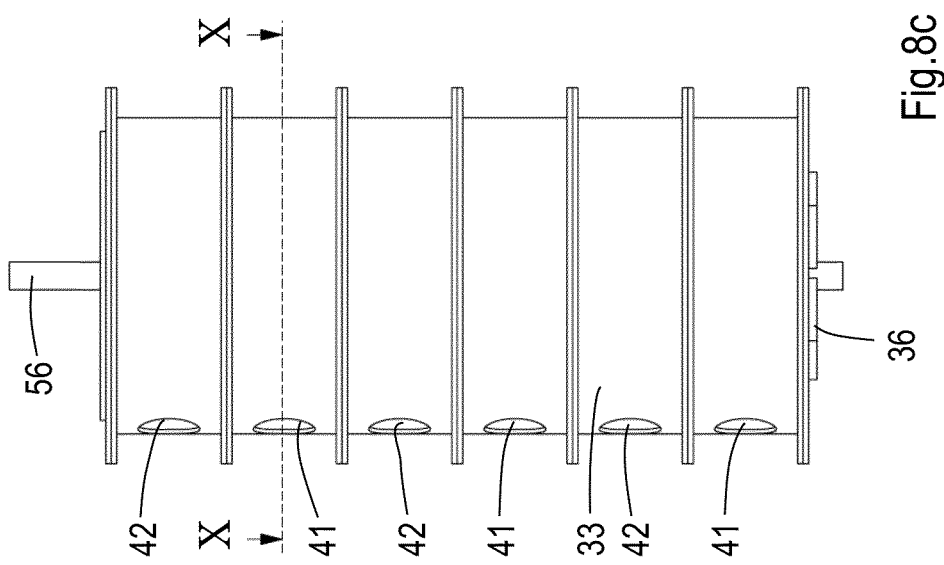
Figure 8B:
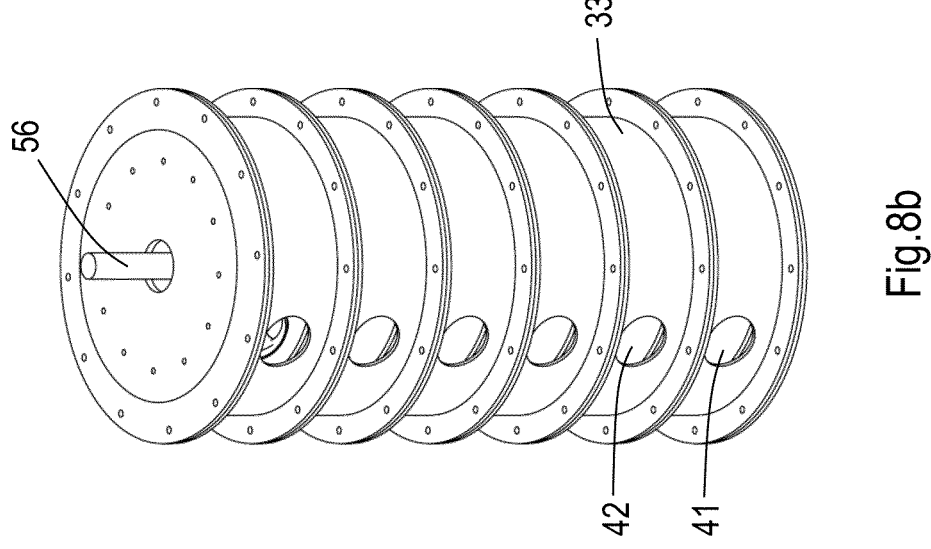
Figure 8A:
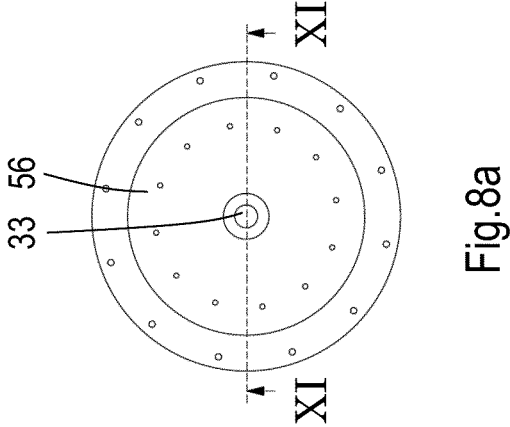

In FIGS. 5-6 a configuration is shown for n is two enabling the valve to connect numerous reactors with two gas loops. In FIG. 8 a rotating valve according to the invention is shown wherein n is three enabling the valve to connect numerous reactors with three gas loops, preferably the air drying gas loop (20), the torrefaction gas loop (25) and the cooling gas loop (26) according to this invention. FIG. 8a shows a top view of the valve (30). An axis pole (56) is shown and is connected (not shown) to the central body part (30a). This pole (56) guided the central body part (30a) when it is moved in an axial direction. The position (56a) where the pole (56) sticks out off the stationary housing (33) is preferably sealed enabling rotation and preventing gas to leak. In this Figure only the exterior of the valve (30) is shown. FIG. 8b shows the valve (30) from aside and 8c from aside. The stationary partition (39) is not shown. The remaining numbering have the same meaning as in FIGS. 5-7.

Figure 9C:
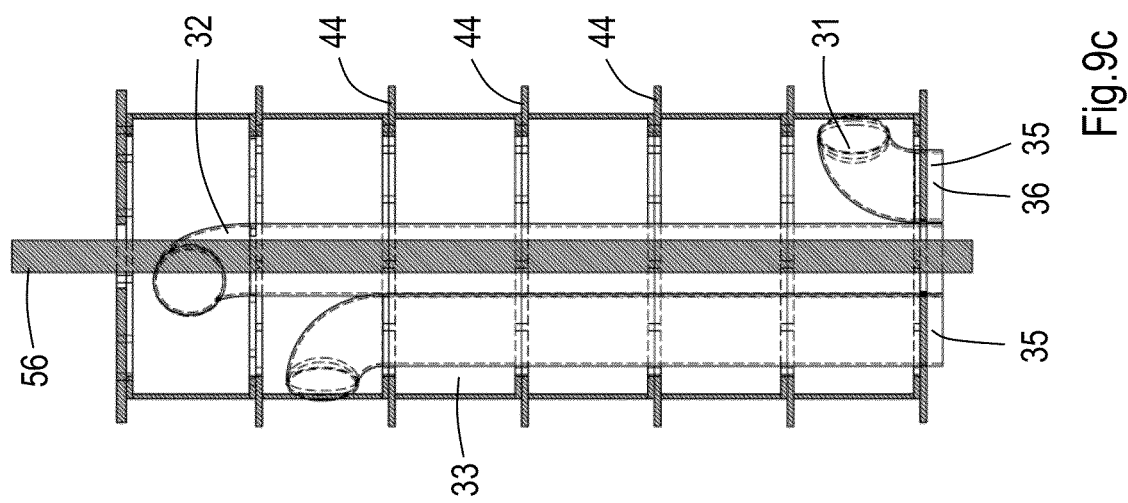
Figure 9B:
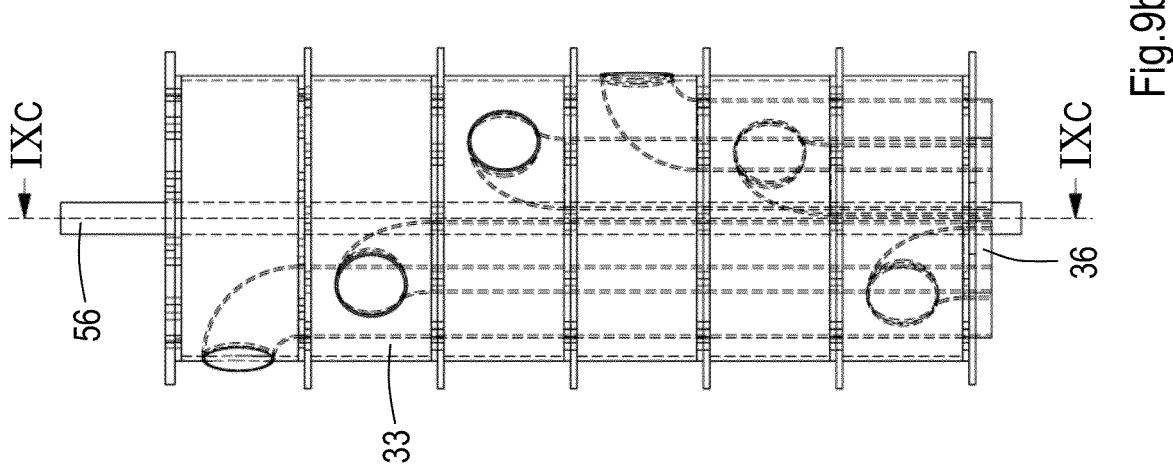
Figure 9A:
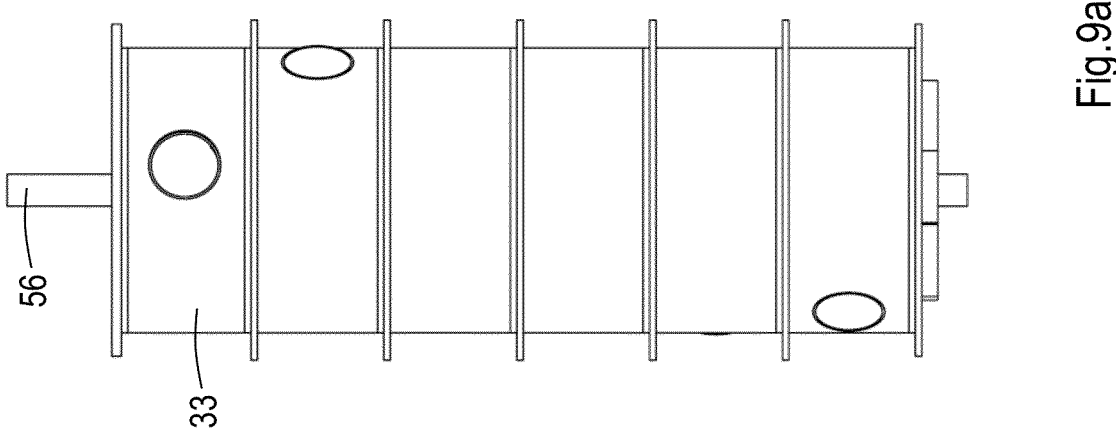

FIG. 9a-c shows the central rotatable body (30a) from aside. FIG. 9b shows three gas inlet conduits (31) and three gas inlet conduits (32) running from side (36) to openings in the wall of the part (30a). The conduits (31,32) may also be conduits which are machined starting from a solid cylindrical part or part (30a) may be manufactured by additive manufacturing. Because the gasses flowing through the conduits (31,32) may have different temperatures the part (30a) will act as a heat transfer apparatus. This is not desired and for this reason measures are suitably taken to minimise such a heat transfer. A simple means is to add an insulation material, like glass wool, in the open area of part (30a). The remaining numbering have the same meaning as in FIGS. 5-7.

The valve is preferably assembled in the following manner. Simply inserting the central body (30a) axially into the stationary part (33) would not be possible because of the inward radially extending surface (45) of the stationary body (33) and the radial extending surfaces (44) of the central body (30a). To enable assembly the stationary part (33) is build up with interconnecting sections (33a-33f) as shown in FIG. 8b and the rotating central body part (30a) is build-up of interconnected sections (30b-30g) as shown in FIG. 9a. The valve is assembled by connecting a new section (33a-33f) and new section (30b-30g) to a previously connected and assembled section (33a-33f) and (30b-30g).

Figure 11:
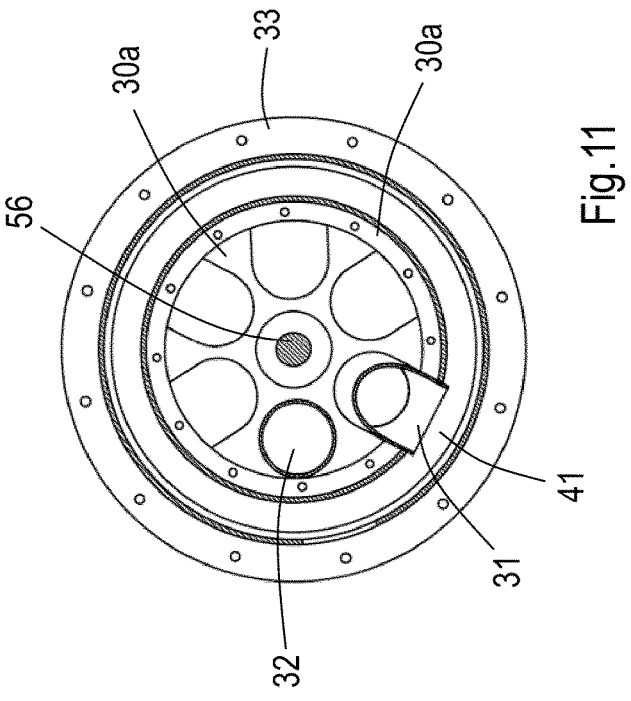
Figure 10:
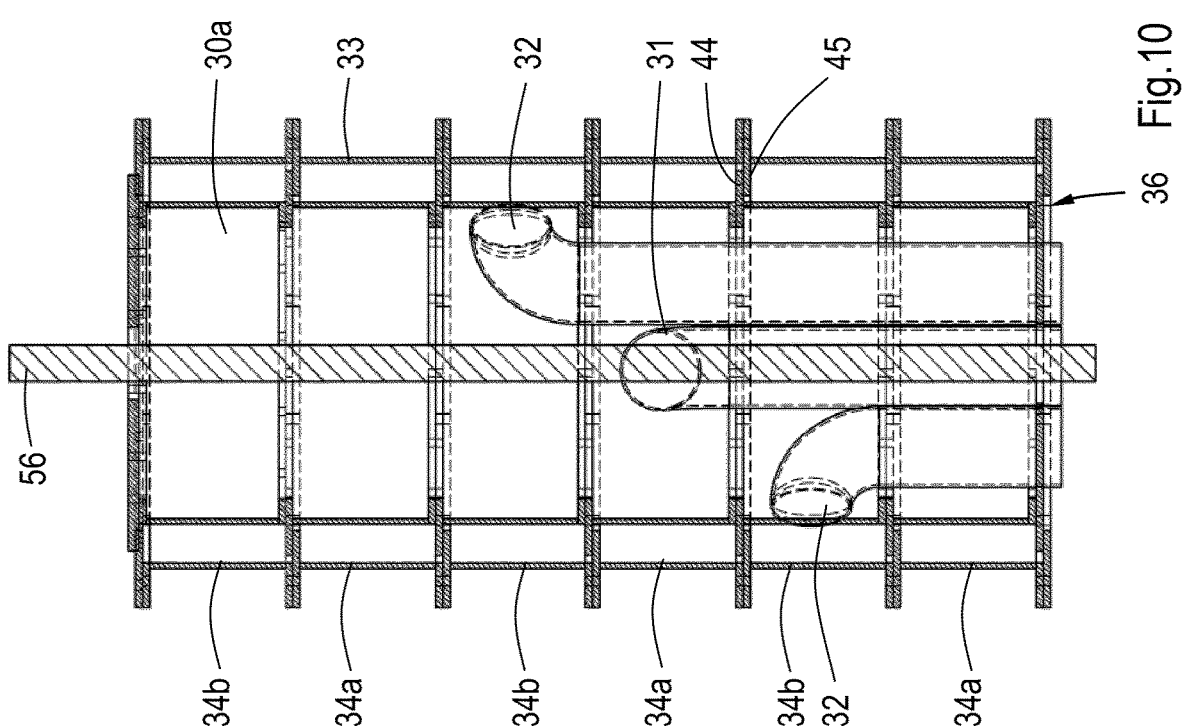

FIG. 10 shows a cross-sectional view GG of FIG. 8a of the assembled rotating valve (30). FIG. 11 shows a cross-sectional view HH of FIG. 8c.

The valve is suitably used in combination with torrefaction batch reactors and more preferably with the torrefaction batch reactors according to this invention as described in this description. The valve, suitably wherein n=3 or higher, can effectively connect the different gas loops (i)-(iii) to the different torrefaction batch reactors without requiring multiple valves and valve operations. When for example the gas inlet and the gas outlet of a torrefaction reactor are connected to a next different gas loop the valve will be moved to another discrete position enabling such a connection as illustrated by FIGS. 5-7. When the rotatable body rotates the two surfaces will axially move apart enabling this rotation. At this point the annular spaces may be fluidly connected and small volumes of one loop may enter another loop. When the rotation and subsequent axial movement to lock the annular spaces is performed within a reasonable short period of time no significant volumes of gasses will have leaked to another gas loop to negatively affect the temperature or cause explosive mixtures.

In a system consisting of eight torrefaction batch reactors the valve may have eight discrete positions. At each position a gas loop may be fluidly connected to more than batch reactors. The gas as provided in said gas loop to the more than one batch reactor may flow in a parallel fashion with respect to the reactors or may flow in series. In a parallel configuration the outlet opening (35) of a gas loop may align with a number of openings (40) corresponding with the number of parallel operated batch reactors. Each openings (40) aligning with outlet opening (35) will then be fluidly connected to the gas inlet of one of the batch reactors. The outlets of the reactors will in turn be fluidly connected to an equal number of openings (40) and all of these openings (40) will be aligned with the gas inlet opening (38) fluidly connected with the gas loop. In an in series configuration channels are provided in the stationary partition (39) such to connect the gas outlet of a first batch reactor with the gas inlet of a next batch reactor.

The invention claimed is:

1. A process to subject a biomass to torrefaction as performed in a configuration of more than one torrefaction batch reactors, wherein the biomass is a fibrous biomass having a bulk density of below 200 kg/m$^3$, by performing a sequence of cycle steps, wherein in one or more cycle steps the following actions (a)-(f) take place simultaneously in the more than one torrefaction batch reactors of the configuration:

(a) providing biomass to a biomass holding space of a torrefaction batch reactor of the configuration, (b) drying a biomass by directly contacting the biomass as present in the holding space of another torrefaction batch reactor with air having a temperature of between 5° and 150° C. thereby obtaining a torrefaction batch reactor comprising dried biomass of the configuration as obtained in an action of (a) of a previous cycle step, (c) heating a dried biomass obtained in an action (b) of a previous cycle step in a different torrefaction batch reactor of the configuration to a temperature of between 23° and 280° C. by directly contacting the dried biomass with a substantially inert gas comprising less than 3 vol. % oxygen and having a temperature of between 23° and 300° C., thereby obtaining torrefaction gas and a torrefaction batch reactor comprising a heated biomass, (d) directly contacting a heated biomass obtained in an action (c) of a previous cycle step in a different torrefaction batch reactor of the configuration with a substantially inert gas comprising less than 3 vol. % oxygen and having a temperature of between 23° and 300° C., thereby obtaining a torrefaction batch reactor comprising torrefied biomass and a torrefaction gas, (e) cooling a torrefied biomass obtained in an action (d) of a previous cycle step comprised in a different torrefaction batch reactor of the configuration by directly contacting the torrefied biomass with a cooling gas having a temperature of between 1° and 100° C. thereby obtaining a torrefaction batch reactor comprising cooled torrefied biomass, and (f) emptying a cooled torrefied biomass obtained in an action (e) of a previous cycle step from a different torrefaction batch reactor and re-using the batch reactor emptied of the cooled torrefied biomass in a next action (a) optionally in the same cycle step;

wherein a torrefaction batch reactor of the configuration comprises of a closed housing having a gas inlet, a gas outlet and a gas permeable biomass holding structure positioned within the housing defining a biomass holding space as present between the gas inlet and the gas outlet, and wherein the gas inlet and the gas outlet of the torrefaction batch reactor are alternatively fluidly connected to the following gas loops, (i) an air drying gas loop, (ii) a torrefaction gas loop, and (iii) a cooling gas loop, wherein one or more torrefaction batch reactors of the configuration are fluidly connected to the air drying gas loop via a rotating valve, and one or more other torrefaction batch reactors are fluidly connected to the torrefaction gas loop (25) via the rotating valve, and one or more torrefaction batch reactors are disconnected from the drying gas loop and torrefaction gas loop, wherein after each cycle step and by rotation of the rotating valve a torrefaction batch reactor of the configuration is connected to the air drying gas loop, a torrefaction batch reactor of the configuration is disconnected from the air drying gas loop and connected to the torrefaction gas loop, a torrefaction batch reactor of the configuration is disconnected from the torrefaction gas loop and connected to the cooling gas loop, and a torrefaction batch reactor of the configuration is disconnected from the cooling gas loop.

2. The process according to claim 1, wherein the time of one cycle step is between 5 and 10 minutes; and wherein one torrefaction batch reactor performs actions (a) and (f) in one cycle step, action (b) in two cycle steps, action (c) in one cycle step and action (d) in three cycle steps and action (e) in one cycle step.

3. The process according to claim 1, wherein the substantially inert gas in action (c) and in action (d) comprises of the torrefaction gas obtained in action (c) and in action (d) and/or a combustion gas obtained when combusting this torrefaction gas; and wherein the substantially inert gas flows in a torrefaction gas loop comprising of a gas heater, a gas displacement means, the biomass holding space, and an outlet for generated torrefaction gas.

4. The process according to claim 3, wherein the torrefaction gas is combusted to provide a combustion gas;

wherein the combustion gas-is used to heat up air by indirect heat exchange; and wherein the heated air is used in action (b).

5. The process according to claim 1, wherein the substantially inert gas used in action (c) and in action (d) at start-up of the process comprises of more than 95% vol % carbon dioxide.

6. The process according to claim 1, wherein the biomass is sugarcane bagasse, sugarcane trash, rice straw, and/or wheat straw.

* * * * *